(12) United States Patent
Tsai et al.

(10) Patent No.: US 7,934,542 B2
(45) Date of Patent: May 3, 2011

(54) TUBE BUNDLE HEAT EXCHANGER OF CONSTANT TEMPERATURE GRADIENT FOR THERMOPHORETIC DEPOSITION OF AEROSOL PARTICLES

(75) Inventors: Chuen-Jinn Tsai, Hsinchu County (TW); Shih-Hsuan Huang, Taipei (TW); Chih-Liang Chien, Taipei (TW)

(73) Assignee: National Chiao Tung University, Hsinchu (TW)

( * ) Notice: Subject to any disclaimer, the term of this patent is extended or adjusted under 35 U.S.C. 154(b) by 240 days.

(21) Appl. No.: 12/394,165

(22) Filed: Feb. 27, 2009

(65) Prior Publication Data

US 2010/0116476 A1    May 13, 2010

(30) Foreign Application Priority Data

Nov. 7, 2008 (TW) ............................... 97143197 A

(51) Int. Cl.
*F28D 7/10* (2006.01)
(52) U.S. Cl. ........................................ 165/157; 165/172
(58) Field of Classification Search ............. 165/104.16, 165/157, 172; 95/288
See application file for complete search history.

(56) References Cited

U.S. PATENT DOCUMENTS 4,766,952 A * 8/1988 Onodera ........................ 165/95
6,666,905 B2   12/2003 Page et al.

OTHER PUBLICATIONS

Tsai, C.J. and Lu, H.C. (1995), Design and Evaluation of a Plate-to-Plate Thermophoretic Precipitator, Aerosol Science and Technology 22, pp. 172-180.
Messerer, A., Niessner, R. and Poschl, U. (2004), Miniature Pipe Bundle Heat Exhanger for Thermophoretic Deposition of Ultrafine Soot Aeorsol Particles at High Flow Velocities, Aerosol Science and Technology, 38, pp. 456-466.

* cited by examiner

*Primary Examiner* — Robert A Hopkins
(74) *Attorney, Agent, or Firm* — Browdy and Neimark, PLLC

(57) ABSTRACT

This invention is a tube bundle heat exchanger for thermophoretic deposition of aerosol particles. It has a housing with an internal chamber, and several cold and hot tubes. The cold and hot tubes are arranged in a staggered manner in the internal chamber of the housing. Low and high temperature fluids flow inside the cold and hot tubes, respectively. When the exhaust gas passes through the chamber, temperature gradient between the cold and hot tubes causes aerosol particles suspended in the exhaust gas to deposit on the surface of cold tubes to achieve the treatment of exhaust gas. Staggered arrangement of cold and hot tubes can maintain nearly constant temperature gradient in the direction of the gas flow thereby enhances the overall removal efficiency of particles.

12 Claims, 8 Drawing Sheets

US 7,934,542 B2

TUBE BUNDLE HEAT EXCHANGER OF CONSTANT TEMPERATURE GRADIENT FOR THERMOPHORETIC DEPOSITION OF AEROSOL PARTICLES

BACKGROUND OF THE INVENTION

1. Field of the Invention

The present invention is related to air pollution control equipments and particularly to a precipitator of tube bundle heat exchanger of constant temperature gradient for thermophoretic deposition of aerosol particles.

2. Description of the Related Art

A conventional pipe bundle heat exchanger for thermophoretic deposition of aerosol particles, which was disclosed in Aerosol Science and Technology by A. Messerer et al., comprises a stainless steel channel and a plurality of miniature pipe bundles. The miniature pipe bundles arranged in the channel are cooled by the inflowing cooling air. When the hot exhaust gas for the treatment is flowing between the miniature pipes and the channel, the temperature gradient between the outer tubes and the walls of the heat exchanger causes aerosol particles suspended in the exhaust gas to deposit on the walls of the cooler miniature pipes due to thermophoresis, and therefore the exhaust gas is purified.

However, thermal gradient is high near the entry of the heat exchanger and decreases exponentially with increasing downstream distance of the flow. This limits the effective deposition region near the entrance of the precipitator and thermophoresis force strongly decreases along the flow direction. Thus, heavy particle deposition near the entrance occurs to cause undesired pressure drop. The effects of entrance clogging lower overall particle removal efficiency.

SUMMARY OF THE INVENTION

The present invention has been accomplished under the circumstances in view. The main objective of the present invention is to provide a tube bundle heat exchanger for thermophoretic deposition of aerosol particles, which provides a uniform temperature gradient, thereby effectively enhance the particle removal efficiency and prevent the entrance clogging problem.

To achieve this and other objectives of the present invention, a tube bundle heat exchanger for thermophoretic deposition of aerosol particles comprises a housing, a plurality of hot tube rows, and a plurality of cold tube rows. The housing comprises a chamber, a gas intake hole and an exhaust hole. The gas intake hole and the exhaust hole respectively extend from the chamber to the outside of the housing. The hot tube rows are mounted in the chamber of the housing. Each hot tube row comprises a plurality of hot tubes respectively spaced from one another by a respective predetermined gap. The hot tubes are connected in series, thereby defining a hot fluid passage. The cold tube rows are mounted in the chamber of the housing. Each cold tube row comprises a plurality of cold tubes respectively spaced from one another by a respective predetermined gap. The cold tubes are connected in series, thereby defining a cold fluid passage. Further, the hot tube rows and the cold tube rows are alternately arranged in the chamber, and predetermined gaps are formed between the hot tube rows and the adjacent cold tube rows.

Further, the hot tube rows and the cold tube rows can be provided with a flat shape and arranged in parallel. Further, the housing comprises a frame body, a front cover mounted on one side of the frame body to support the cold tube rows, and a back cover mounted on the opposite side of the frame body to support the hot tube rows. The front cover comprises a cold fluid inlet and a cold fluid outlet respectively connected to the two opposite ends of the cold fluid passage. The back cover comprises a hot fluid inlet and a hot fluid outlet respectively connected to the two opposite ends of the hot fluid passage.

Further, the front cover comprises a first cold fluid chamber disposed in fluid communication between the cold fluid inlet and the cold fluid passage, and a second cold fluid chamber disposed in fluid communication between the cold fluid outlet and the cold fluid passage. The back cover comprises a first hot fluid chamber disposed in fluid communication between the hot fluid inlet and the hot fluid passage, and a second hot fluid chamber disposed in fluid communication between the hot fluid outlet and the hot fluid passage.

Further, the hot tubes of the hot tube rows and the cold tubes of the cold tube rows can be rectangular tubes, round tubes, or hexagonal tubes. Further, two internal thermal insulation spacers are bilaterally mounted inside the chamber and respectively set between two opposite inside walls of the housing and the hot tube rows and cold tube rows. Further, a first external thermal insulation spacer is set between the frame body and the front cover, comprising at least one through hole for the passing of the cold tube rows. Further, a second external thermal insulation spacer is set between the frame body and the back cover, comprising at least one through hole for the passing of the hot tube rows. Further, the cold tubes of the cold tube rows can be coated with a layer of oxidation catalyst. Further, the hot tubes of the hot tube rows and the cold tubes of the cold tube rows can be arranged in an array, and the hot tubes or cold tubes of one same row can be aligned in an in-line or in a staggered manner.

DETAILED DESCRIPTION OF THE INVENTION

Figure 1:
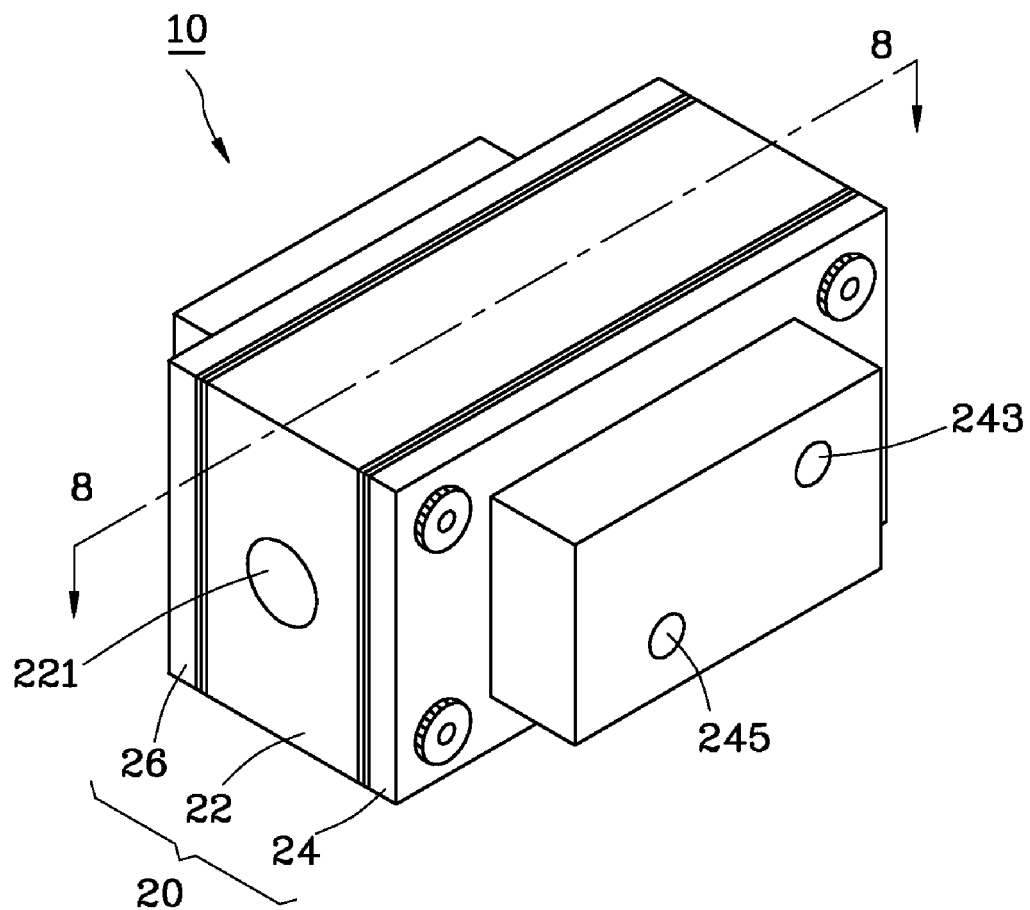
FIG. 1 is an elevation view of a tube bundle heat exchanger for thermophoretic deposition of aerosol particles in accordance with a first embodiment of the present invention.
Figure 2:
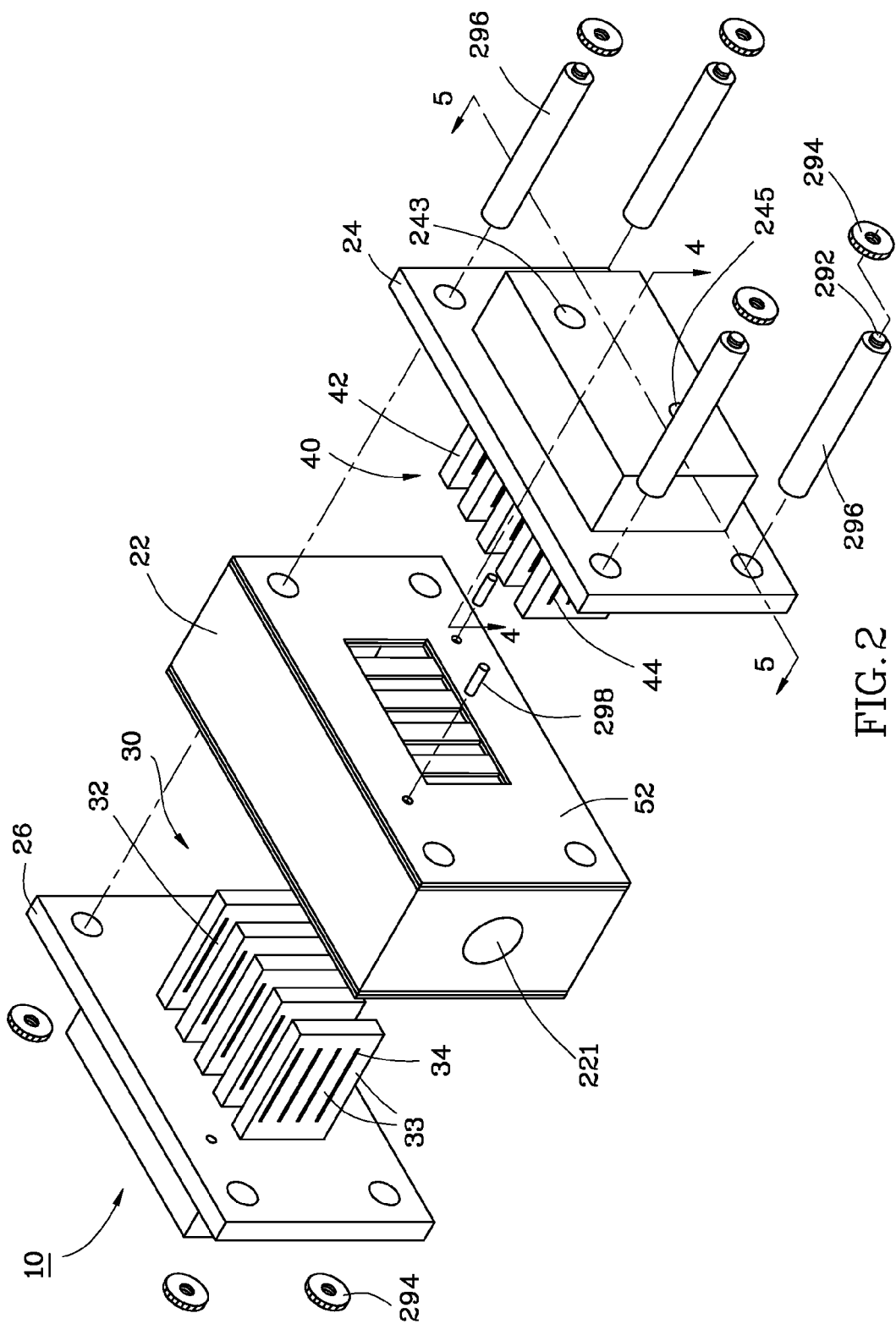
FIG. 2 is an exploded view of the tube bundle heat exchanger for thermophoretic deposition of aerosol particles in accordance with the first embodiment of the present invention.
Figure 3:
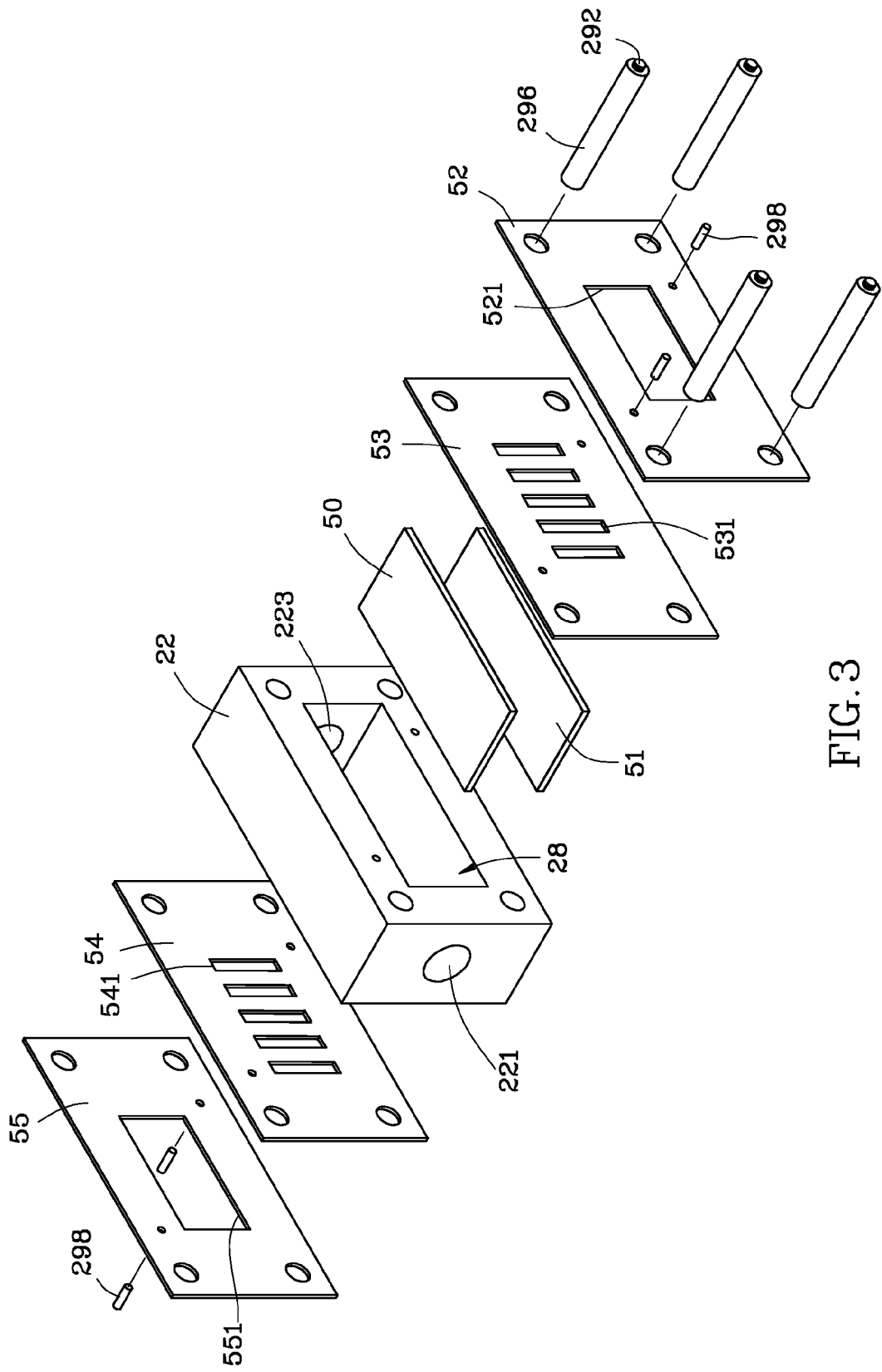
FIG. 3 is an exploded view of the first embodiment of the present invention, showing the arrangement of the internal and external thermal insulation spacers.

Referring to FIGS. 1~3, a tube bundle heat exchanger 10 for thermophoretic deposition of aerosol particles in accordance with a first embodiment of the present invention comprises a housing 20, a plurality of hot tube rows 30, a plurality of cold tube rows 40, two internal thermal insulation spacers 50 and 51, and four external thermal insulation spacers 52~55.

Figure 4:
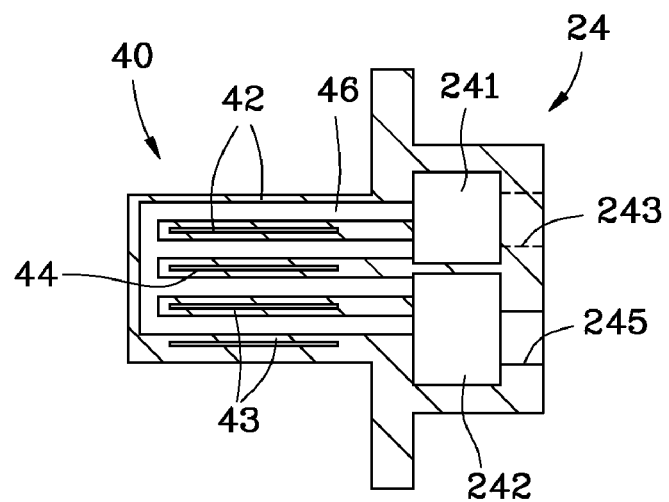
FIG. 4 is a sectional view taken along line 4-4 of FIG. 2.
Figure 5:
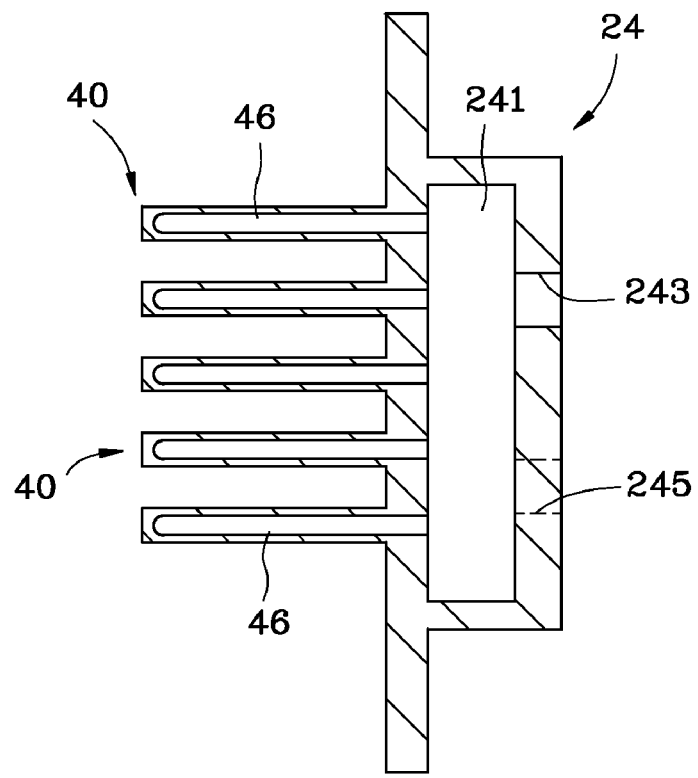
FIG. 5 is a sectional view taken along line 5-5 of FIG. 2.
Figure 6:
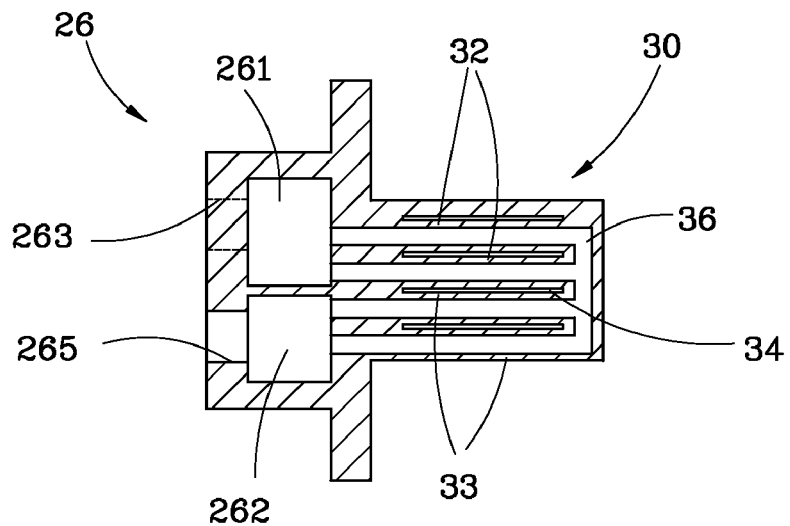
FIG. 6 is a sectional view of the hot tube rows of the tube bundle heat exchanger for thermophoretic deposition of aerosol particles in accordance with the first embodiment of the present invention (I).
Figure 7:
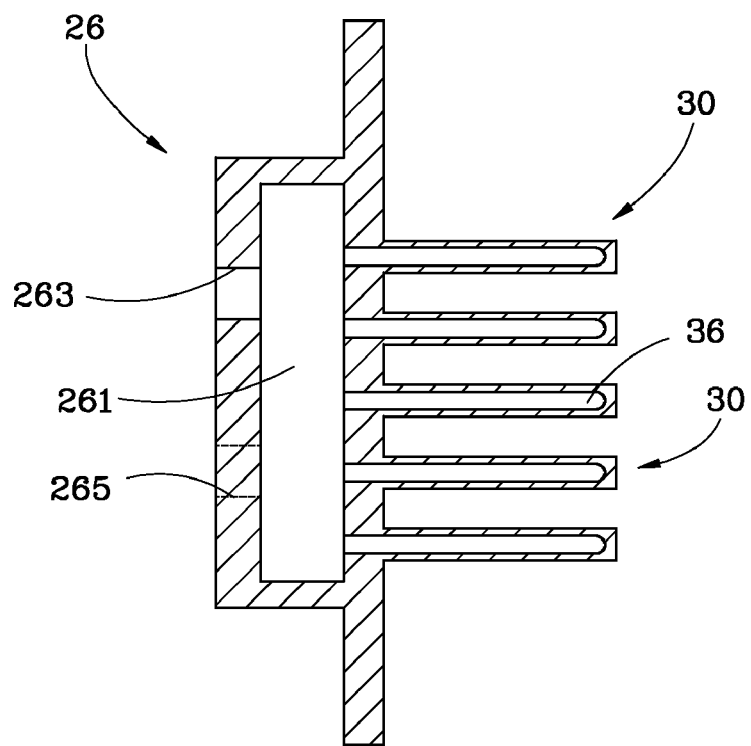
FIG. 7 is a sectional view of the hot tube rows of the tube bundle heat exchanger for thermophoretic deposition of aerosol particles in accordance with the first embodiment of the present invention (II).

The housing 20 is formed of a frame body 22, a front cover 24 and a back cover 26. The housing 20 defines therein a chamber 28. Further, the housing 20 has a gas intake hole 221 and an exhaust hole 223. The gas intake hole 221 and the exhaust hole 223 respectively extend from the chamber 28 to the outside of the housing 20. As shown in FIGS. 2, 4 and 5, the front cover 24 is mounted on one side of the frame body 22, comprising two cold fluid chambers 241 and 242, a cold fluid inlet 243, and a cold fluid outlet 245. The cold fluid inlet 243 extends from one cold fluid chamber 241 to the outside of the front cover 24. The cold fluid outlet 245 extends from the other cold fluid chamber 242 to the outside of the front cover 24. As shown in FIGS. 6 and 7, the back cover 26 is mounted on the other side of the frame body 22, comprising two hot fluid chambers 261 and 262, a hot fluid inlet 263, and a hot fluid outlet 265. The hot fluid inlet 263 extends from one hot fluid chamber 261 to the outside of the back cover 26. The hot fluid outlet 265 extends from the other hot fluid chamber 262 to the outside of the back cover 26. Further, the frame body 22, the front cover 24 and the back cover 26 are fastened together with screw rods 292 and nuts 294. Heat insulation sleeves 296 are respectively sleeved onto the screw rods 292 to prevent heat conduction between the screw rods 292 and the frame body 22, front cover 24 and back cover 26. Further, locating pins 298 are provided between the frame body 22 and the front cover 24 and between the frame body 22 and the back cover 26. The locating pins 298 are made from a thermal insulation material, assuring accurate connection of the frame body 22, the front cover 24 and the back cover 26.

Referring to FIGS. 6 and 7, the hot tube rows 30 are provided with a flat shape, mounted on the back cover 26 of the housing 20 and accommodated in the chamber 28. Each hot tube row 30 comprises four hot tubes 32, 33 arranged in parallel. These hot tubes 32, 33 are rectangular tubes. A predetermined gap 34 is formed between each two adjacent ones of the hot tubes 32, 33. The hot tubes 32, 33 are arranged into two sets. The two hot tubes 32 of one hot tube set each have one end connected to one ends of the two hot tubes 33 of the other hot tube set. The respective other ends of the hot tubes 32, 33 are respectively connected to the hot fluid chambers 261 and 262 of the back cover 26. Therefore, each hot tube row 30 defines a hot fluid passage 36 in communication between the two hot fluid chambers 261 and 262.

Thus, a user can inject a high temperature fluid (such as silicon oil) through the hot fluid inlet 263 of the back cover 26 into the hot fluid chamber 261, enabling the high temperature fluid to flow through the hot fluid passages 36 where the high temperature fluid raises the temperature of the hot tube rows 30, and then to flow through the hot fluid chamber 262 and hot fluid outlet 265 of the back cover 26 to the outside of the tube bundle heat exchanger 10.

Figure 8:
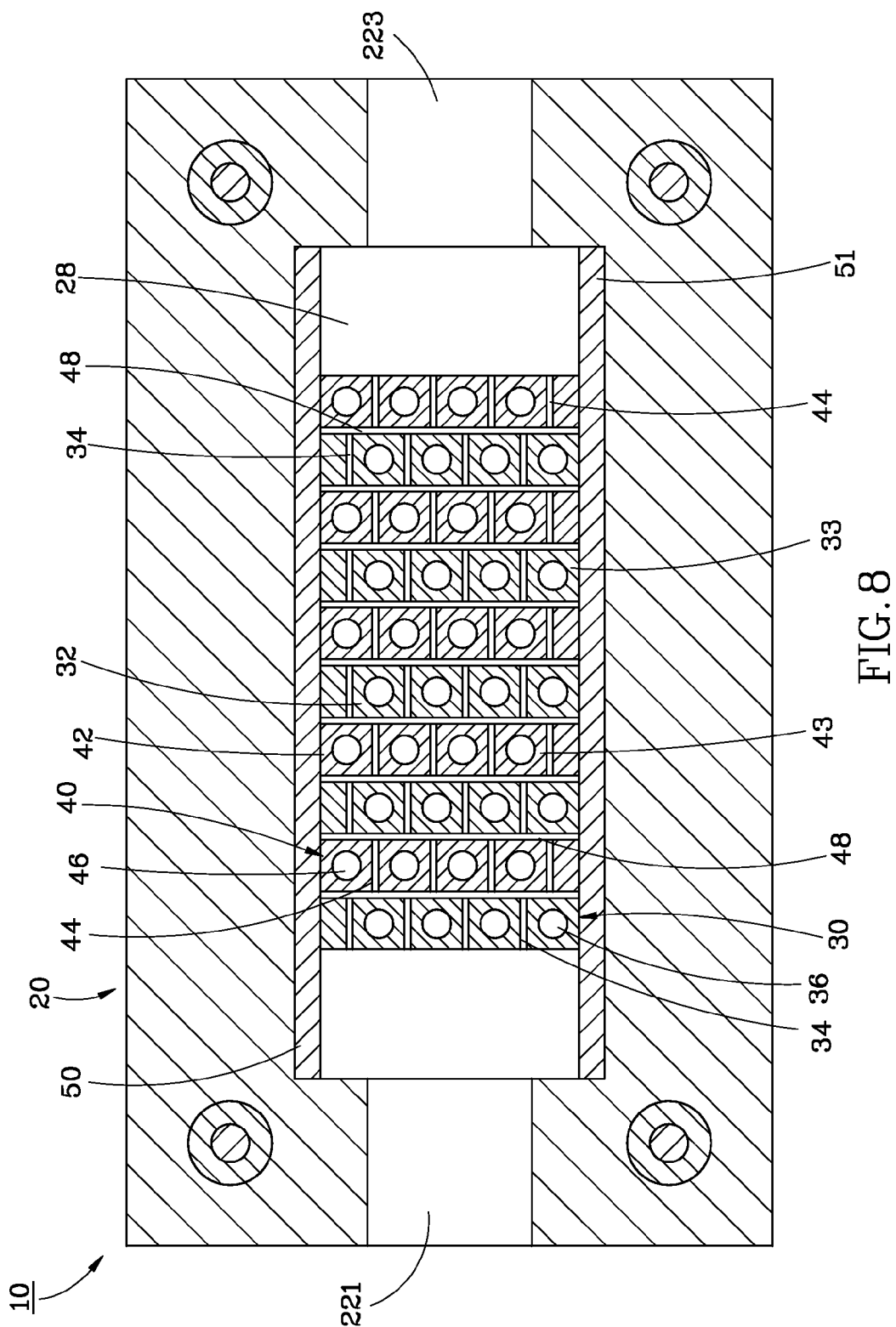
FIG. 8 is a sectional view taken in an enlarged scale along line 8-8 of FIG. 1.

Referring to FIGS. 4 and 5 again, the cold tube rows 40 are provided with a flat shape, mounted on the front cover 24 of the housing 20 and accommodated in the chamber 28. Each cold tube row 40 comprises four cold tubes 42, 43 arranged in parallel. These cold tubes 42, 43 are rectangular tubes. A predetermined gap 44 is formed between each two adjacent ones of the cold tubes 42, 43. The cold tubes 42, 43 are arranged into two sets. The two cold tubes 42 of one cold tube set each have one end respectively connected to one ends of the two cold tubes 43 of the other cold tube set. The respective other ends of the cold tubes 42, 43 are respectively connected to the cold fluid chambers 241 and 242 of the front cover 24. Therefore, each cold tube row 40 defines a cold fluid passage 46 in communication between the two cold fluid chambers 241 and 242. As shown in FIG. 8, the hot tube rows 30 and the cold tube rows 40 are alternately arranged in parallel in the chamber 28, and predetermined gaps 48 are formed between the adjacent hot tube rows 30 and cold tube rows 40. The hot tubes 32, 33 and cold tubes 42, 43 are arranged in a staggered manner and therefore the exhaust gas to be treated passes the hot tubes 32, 33 and the cold tubes 42, 43 in the chamber 28 in a detoured manner. Further, the cold tubes 42, 43 are peripherally coated with a layer of oxidation catalyst.

Thus, a user can inject a low temperature fluid (such as water at the room temperature) through the cold fluid inlet 243 of the front cover 24 into the cold fluid chamber 241, enabling the low temperature fluid to flow through the cold fluid passages 46 where the low temperature fluid lowers the temperature of the cold tube rows 40, and then to flow through the cold fluid chamber 242 and cold fluid outlet 245 of the front cover 24 to the outside of the tube bundle heat exchanger 10. Further, by means of the hot tube rows 30 and the cold tube rows 40, a temperature gradient is formed between the hot tube rows 30 and the cold tube rows 40.

Referring to FIG. 8 again, the two internal thermal insulation spacers 50 and 51 are mounted in the chamber 28 of the housing 20 and respectively stopped between the two opposite inside walls of the frame body 22 and the hot tube rows 30 and cold tube rows 40. According to the present embodiment, the two internal thermal insulation spacers 50 and 51 are made of fiberglass.

Referring to FIGS. 2 and 3 again, the four external thermal insulation spacers 52~55 are made of asbestos and arranged in two sets. Two external thermal insulation spacers 52, 53 are sandwiched between the frame body 22 and front cover 24 of the housing 20 to prevent heat conduction between the frame body 22 and front cover 24 of the housing 20. Each external thermal insulation spacers 52, 53 has at least one through hole 521 or 531 for the passing of the cold tube rows 40. The other two external thermal insulation spacers 54, 55 are sandwiched between the frame body 22 and back cover 26 of the housing 20 to prevent heat conduction between the frame body 22 and back cover 26 of the housing 20. Each external thermal insulation spacers 54, 55 has at least one through hole 541 or 551 for the passing of the hot tube rows 30.

Referring to FIG. 8 again, when the exhaust gas to be treated passes through the gas intake hole 221 into the chamber 28, it flows through the predetermined gaps 34, 44 and the predetermined gaps 48 over the hot tubes 32, 33 and the cold tubes 42, 43 alternately. Because of the presence of a temperature gradient between the exhaust gas and the hot tubes 32, 33 and between the exhaust gas and the cold tubes 42, 43, aerosol particles in the exhaust gas are forced away from the hot tubes 32, 33 to deposit on the surface of the cold tubes 42, 43 under thermophoretic effects. Therefore, particles are efficiently removed from the exhaust gas. Further, the catalyst coated on the cold tubes 42, 43 decomposes the deposited particles partially. The purified gas flows out of the tube bundle heat exchanger 10 through the exhaust hole 223.

The tube bundle heat exchanger 10 provided with alternate cool and hot tube rows 30, 40 maintains nearly constant temperature gradients in the flow direction of the waste gas, and therefore aerosol particles are capable of more uniformly depositing on the surface of cold tubes 42, 43. It is helpful to enhance the overall removal efficiency of aerosol particles and prevent the tube bundle heat exchanger 10 from obstruction.

Figure 9:
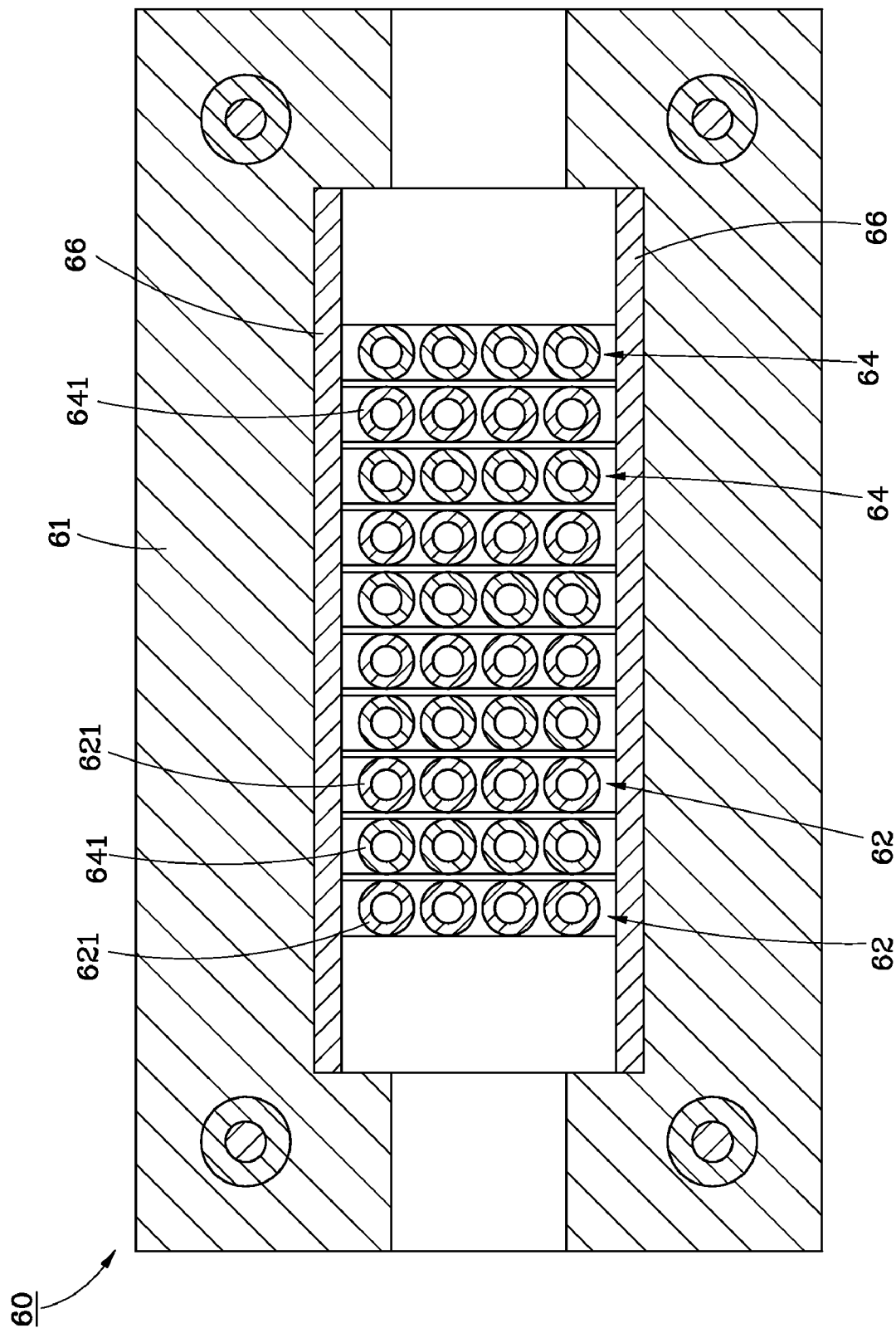
FIG. 9 is a sectional view of a tube bundle heat exchanger for thermophoretic deposition of aerosol particles in accordance with a second embodiment of the present invention.

Further, the arrangement of the hot tubes 32, 33 and the cold tubes 42, 43 may be changed. FIG. 9 shows a tube bundle heat exchanger 60 for thermophoretic deposition of aerosol particles in accordance with a second embodiment of the present invention. According to this second embodiment, the tube bundle heat exchanger 60 comprises a housing 61, a plurality of hot tube rows 62, a plurality of cold tube rows 64, and a plurality of thermal insulation spacers 66. This second embodiment is substantially similar to the aforesaid first embodiment with the exception that the hot tubes 621 of the hot tube rows 62 and the cold tubes 641 of the cold tube rows 64 are round tubes to lower pressure drop. Further, the hot tubes 621 and the cold tubes 641 are arranged in an array and transversely and longitudinally aligned in in-lines.

Figure 10:
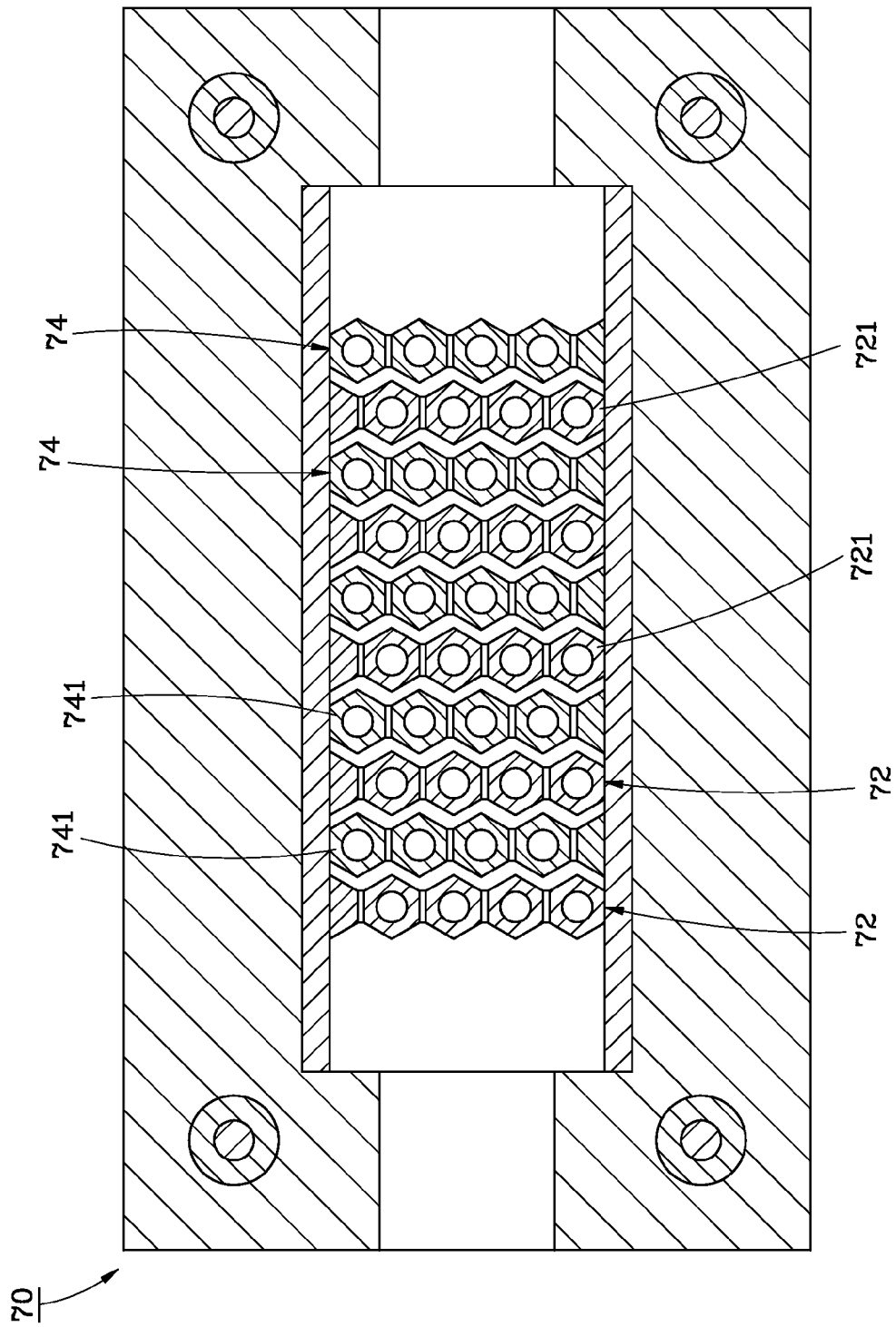
FIG. 10 is a sectional view of a tube bundle heat exchanger for thermophoretic deposition of aerosol particles in accordance with a third embodiment of the present invention.

FIG. 10 shows a tube bundle heat exchanger 70 for thermophoretic deposition of aerosol particles in accordance with a third embodiment of the present invention. This third embodiment is substantially similar to the aforesaid first embodiment with the exception that the hot tubes 721 of the hot tube rows 72 and the cold tubes 741 of the cold tube rows 74 are hexagonal tubes arranged in a staggered manner.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tube bundle heat exchanger for thermophoretic deposition of aerosol particles, comprising:
    a housing, said housing comprising a chamber, a gas intake hole and an exhaust hole, said gas intake hole and said exhaust hole respectively extending from said chamber to the outside of said housing;
    a plurality of hot tube rows mounted in said chamber of said housing, each said hot tube row comprising a plurality of hot tubes respectively spaced from one another by at least one respective predetermined gap, said hot tubes being connected in series to define a hot fluid passage therein; and
    a plurality of cold tube rows mounted in said chamber of said housing, each said cold tube row comprising a plurality of cold tubes respectively spaced from one another by at least one respective predetermined gap, said cold tubes being connected in series to define a cold fluid passage therein;
    wherein said hot tube rows and said cold tube rows are alternately arranged in said chamber, and predetermined gaps are formed between the hot tube rows and the adjacent cold tube rows.

2. The tube bundle heat exchanger for thermophoretic deposition of aerosol particles as claimed in claim 1, wherein said hot tube rows and said cold tube rows are provided with a flat shape and arranged in parallel.

3. The tube bundle heat exchanger for thermophoretic deposition of aerosol particles as claimed in claim 1, wherein said housing comprises a frame body, a front cover mounted on one side of said frame body to support said cold tube rows, and a back cover mounted on an opposite side of said frame body to support said hot tube rows, said front cover comprising a cold fluid inlet and a cold fluid outlet respectively connected to two opposite ends of said cold fluid passage, said back cover comprising a hot fluid inlet and a hot fluid outlet respectively connected to two opposite ends of said hot fluid passage.

4. The tube bundle heat exchanger for thermophoretic deposition of aerosol particles as claimed in claim 3, wherein said front cover comprises a first cold fluid chamber disposed in fluid communication between said cold fluid inlet and said cold fluid passage and a second cold fluid chamber disposed in fluid communication between said cold fluid outlet and said cold fluid passage; said back cover comprises a first hot fluid chamber disposed in fluid communication between said hot fluid inlet and said hot fluid passage and a second hot fluid chamber disposed in fluid communication between said hot fluid outlet and said hot fluid passage.

5. The tube bundle heat exchanger for thermophoretic deposition of aerosol particles as claimed in claim 1, wherein said hot tubes of said hot tube rows and said cold tubes of said cold tube rows are rectangular tubes.

6. The tube bundle heat exchanger for thermophoretic deposition of aerosol particles as claimed in claim 1, wherein said hot tubes of said hot tube rows and said cold tubes of said cold tube rows are round tubes.

7. The tube bundle heat exchanger for thermophoretic deposition of aerosol particles as claimed in claim 1, wherein said hot tubes of said hot tube rows and said cold tubes of said cold tube rows are hexagonal tubes.

8. The tube bundle heat exchanger for thermophoretic deposition of aerosol particles as claimed in claim 1, further comprising two internal thermal insulation spacers bilaterally mounted inside said chamber and respectively set between two opposite inside walls of said housing and said hot tube rows and said cold tube rows.

9. The tube bundle heat exchanger for thermophoretic deposition of aerosol particles as claimed in claim 1, wherein said housing comprises a frame body, a front cover mounted on one side of said frame body, a back cover mounted on an opposite side of said frame body, a first external thermal insulation spacer set between said frame body and said front cover, and a second external thermal insulation spacer set between said frame body and said back cover, said first external thermal insulation spacer comprising at least one through hole for the passing of said cold tube rows, said second external thermal insulation spacer comprising at least one through hole for the passing of said hot tube rows.

10. The tube bundle heat exchanger for thermophoretic deposition of aerosol particles as claimed in claim 1, wherein said cold tubes of said cold tube rows are coated with a layer of oxidation catalyst.

11. The tube bundle heat exchanger for thermophoretic deposition of aerosol particles as claimed in claim 1, wherein said hot tubes of said hot tube rows and said cold tubes of said cold tube rows are arranged in an array and aligned in in-lines.

12. The tube bundle heat exchanger for thermophoretic deposition of aerosol particles as claimed in claim 1, wherein said hot tubes of said hot tube rows and said cold tubes of said cold tube rows are arranged in a staggered manner.

* * * * *